UNITED STATES PATENT OFFICE.

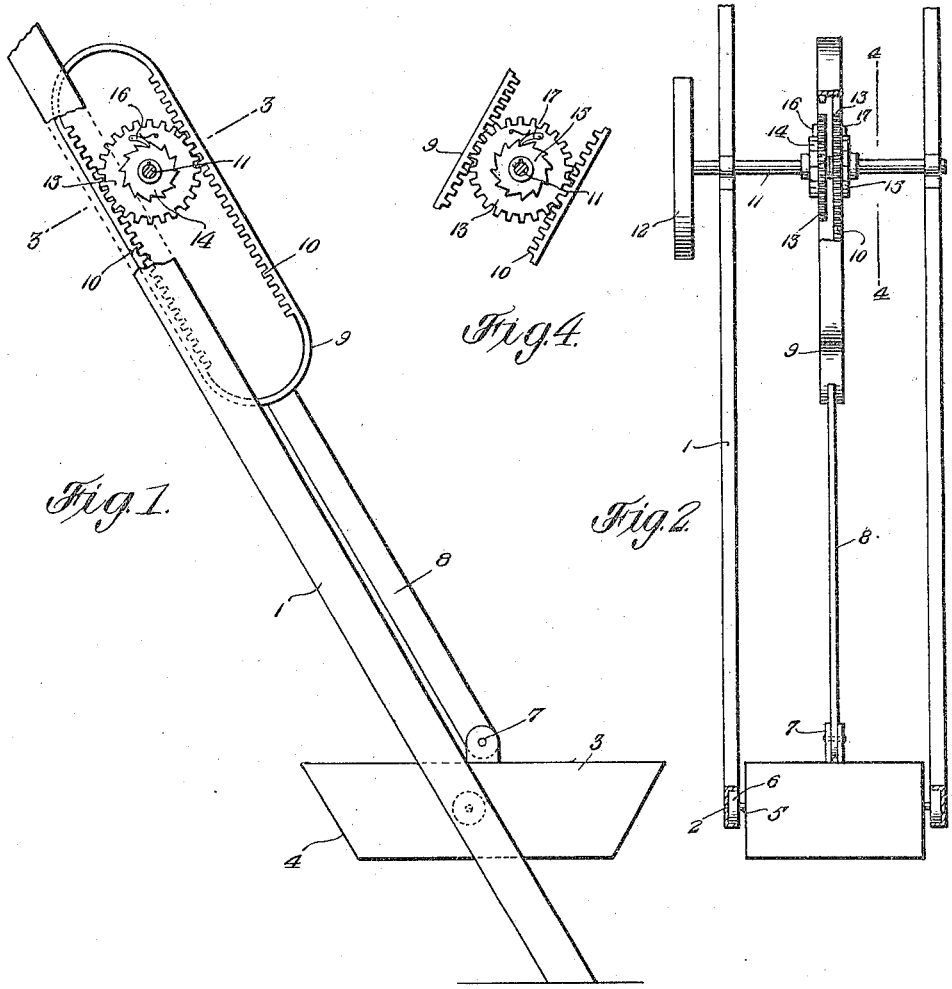
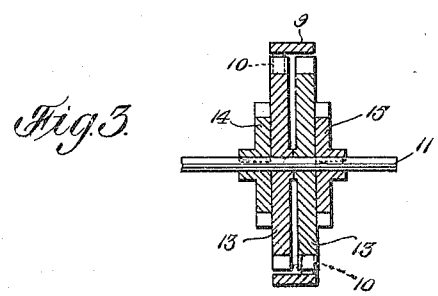

ALEXANDER S. HULDEN, OF GREAT FALLS, MONTANA.

WAVE-MOTOR.

1,213,104. Specification of Letters Patent. Patented Jan. 16, 1917.

Application filed July 7, 1915. Serial No. 38,504.

*To all whom it may concern:*

Be it known that I, ALEXANDER S. HULDEN, a citizen of the United States, residing at Great Falls, in the county of Cascade and State of Montana, have invented new and useful Improvements in Wave-Motors, of which the following is a specification.

The present invention relates to improvements in motors which derive their power from water waves, and the primary object of the invention is to construct a device of this character which shall include a swinging float which is capable of moving in a vertical as well as in a circumferential direction about its pivot so as to be constantly in motion and to impart a movement to a suitable shaft and which is operated by a rod pivotally connected to the said float.

Another object of the invention is to simplify and improve the existing art by providing a device of this class which shall be simple, cheap and thoroughly efficient in operation.

With the above and other objects in view, the improvement resides in the construction, combination and arrangement of parts set forth in the following specification and falling within the scope of the appended claims.

In the drawing: Figure 1 is a side elevation of a wave motor constructed in accordance with the present invention, parts being broken away and parts being shown in section, Fig. 2 is a face view of the same, parts being broken away, and Fig. 3 is a vertical longitudinal sectional view approximately on the line 3—3 of Fig. 1. Fig. 4 is a detail view of the tooth wheel and ratchet wheel looking from the opposite side of the mechanism as that shown in Fig. 1.

Referring now to the drawings in detail, 1—1 designates a pair of similar constructed spaced standards, the same being sustained at an angle as illustrated in the drawing. These standards have their inner faces channeled, as indicated by the numerals 2 and arranged between the standards is a float 3. The float preferably comprises a box-like structure having its ends beveled from its top inwardly toward its bottom, as indicated by the numeral 4, so that the said ends will be readily contacted by the waves in the water to swing or oscillate the said float, and the sides of the float are provided with short shafts 5 upon which are arranged guide wheels or rollers 6, one of said rollers being received within one of the channels of each of the standards 1, and the said float is adapted to be raised or lowered upon the said standards, in accordance with the rise and fall of the water within which the float is arranged.

The top of the float has pivoted approximately centrally thereto, as indicated by the numeral 7, a rod 8, and this rod has its upper end yoke-shaped, as indicated by the numeral 9. One of the arms provided by the yoke 9 adjacent one of its edges is provided with inwardly projecting teeth 10, and the second arm of said yoke is likewise provided with inwardly extending teeth 10 which are arranged adjacent its edge diametrically opposite the edge of the first mentioned arm. Passing through the yoke 9 is a shaft 11, having one of its ends provided with a flywheel 12, while loosely mounted for rotation upon the said shaft is a pair of toothed wheels 13—13, one of said toothed wheels engaging with one of the racks upon the respective sides or arms of the yoke 9. Secured to the shaft 11 to the opposite sides of the respective toothed wheels 13—13 is a pair of ratchet wheels, indicated by the numerals 14 and 15, the said ratchets having their teeth reversely arranged, and pivoted to the respective toothed wheels 13 are spring pressed pawls 16 and 17 which engage with the teeth of the respective ratchet wheels 14 and 15. This arrangement, it will be noted, permits of the shaft 11 being rotated in one direction, irrespective of the direction of movement of the yoke 9 and consequently the direction of movement of the float 2, and it is, of course, to be understood that the shaft is journaled in suitable bearings and if desired certain of the bearings may be provided upon the upper ends of the standards 1. When motion is imparted to the float 4 by the movement of the waves or swells of water engaging the under side thereof, the float being mounted for vertical reciprocating movement as well as oscillatory movement, the rod 8 with the yoke 9 will be reciprocated to impart a continuous rotary motion to the shaft 11 through the medium of the racks 10, gears 13, 14 and 15 and thus converting the wave power into mechanical energy.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. The combination with a shaft journaled in bearings, two toothed wheels loosely arranged upon the shaft, ratchet wheels rigidly secured to the shaft and disposed one adjacent each of the respective toothed wheels, spring pressed pawls upon the toothed wheels engaging with the respective ratchet wheels, of two parallel standards arranged at an inclination and having their inner faces channeled longitudinally, a float disposed between the standards, said float having its opposite ends beveled, short shafts upon the sides of the float, roller wheels upon the said shafts received within the channels of the standards, a rod pivotally secured to the upper face and approximately central of the float and disposed parallel with the standards, said rod having its free end provided with a yoke-shaped extension, the arms provided by the extension being formed adjacent their diametrically opposite edges with a pair of rack bars, and one of said rack bars adapted to co-act with one of the respective toothed wheels upon the shaft.

2. A wave motor comprising a pair of spaced standards arranged on an incline to the perpendicular, each of said standards being provided on their confronting faces with channels, a float pivotally and slidably mounted within said channels, a shaft journaled adjacent to one end of the standards and connecting the same, a rod arranged parallel to the standards and having one end thereof pivotally connected to said float at one side of its pivot, and a connection between the other end of the rod and the shaft for imparting a continuous rotary motion to the shaft when the float is moved.

In testimony whereof I affix my signature in presence of two witnesses.

ALEXANDER S. HULDEN.

Witnesses:
V. A. ANDREWS,
SOPHIA H. ANDREWS.

Copies of this patent may be obtained for five cents each, by addressing the "Commissioner of Patents. Washington, D. C."